Jan. 19, 1965     H. G. NÖLLER     3,165,929
CLINICAL THERMOMETER
Filed Nov. 16, 1962     2 Sheets-Sheet 1

Inventor:
Hans Günter Nöller
by Hans Berman
Agent

Jan. 19, 1965   H. G. NÖLLER   3,165,929
CLINICAL THERMOMETER
Filed Nov. 16, 1962   2 Sheets-Sheet 2
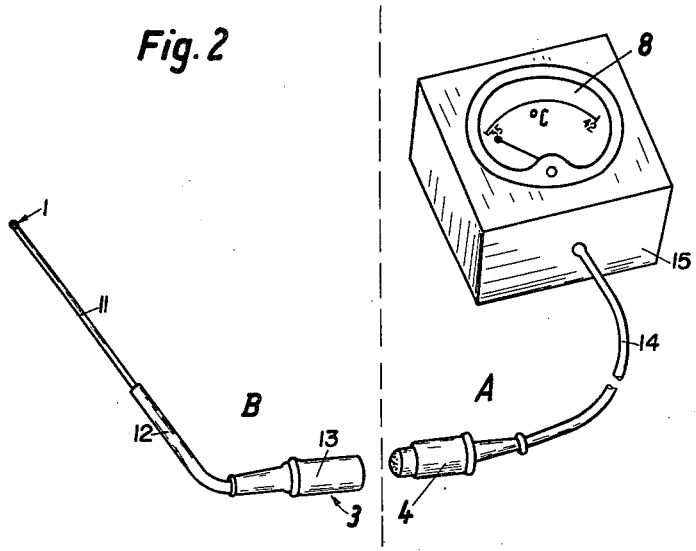
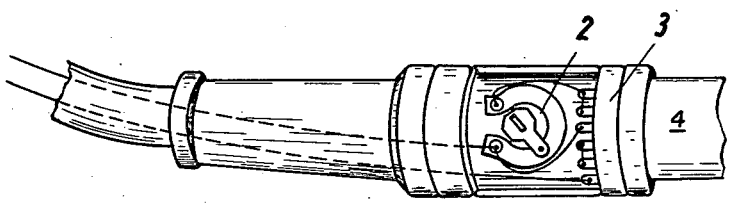
*Inventor:*
Hans Günter Nöller
by   *Hans Berman*
Agent

United States Patent Office 3,165,929
Patented Jan. 19, 1965

3,165,929
CLINICAL THERMOMETER
Hans Günter Nöller, Fasanenweg 4,
Heidelberg, Germany
Filed Nov. 16, 1962, Ser. No. 238,123
Claims priority, application Germany Nov. 22, 1961
9 Claims. (Cl. 73—362)

This invention relates to the measurement of human body temperatures, and more particularly to a thermometer for clinical use in routine temperature determinations.

The primary object of the invention is a thermometer which permits the body temperature of a substantial number of hospital patients to be determined by unskilled or semi-skilled personnel in the shortest possible time.

Such a thermometer should be portable, acceptable from a hygienic point of view, rugged to the point of being insensitive to rough handling, safe for the patient and the nurse, simple and foolproof in its operation, and capable of giving a readily ascertainable and precise indication of the temperature measured within a very brief span of time.

That the commonly employed mercury thermometers do not fully meet many of these requirements is obvious. They are breakable, and are frequently broken in clinical use. The glass splinters and the spilled drops of mercury endanger the safety of patient and nurse alike. The period required for a mercury thermometer to reach the temperature of the mouth or the rectum in which it is inserted is of the order of minutes so that much valuable time is wasted.

It is common practice in other fields to employ electrical and electronic temperature measuring devices which avoid the use of such inherently unsafe materials as glass or mercury, and whose temperature sensing elements have very little heat capacity so as to give practically instantaneous readings. Such devices have been employed successfully in clinical research, but have not been adapted heretofore to routine use in the hospital ward. The research instruments available are costly and relatively difficult to operate. The time gained by the availability of a temperature reading almost immediately after insertion of the temperature sensing element in the body is lost in the adjustment of the research instrument necessary before each measurement.

This invention aims at combining the operational simplicity of the mercury filled glass rod thermometer with the rapid temperature indication of the known electrical or electronic devices while avoiding the shortcomings of either type of temperature measuring apparatus.

With these and other objects in view, the invention, in one of its aspects, provides an instrument including a source of electric current, an electrical measuring instrument, a temperature-sensitive resistor element, a variable resistor, and two reference resistors. The two elements of a coupling are interposed between the several constituent parts of the instrument. The temperature-sensitive resistor element and the variable resistor are conductively connected to one coupling element, whereas the other coupling element is conductively connected to the other instrument parts in such a manner that engagement of the coupling elements connects the several instrument parts in a Wheatstone bridge arrangement.

Other features and many of the attendant advantages of this invention will be readily appreciated as the same becomes better understood by reference to the following detailed description of a preferred embodiment when considered in connection with the accompanying drawings wherein:

FIG. 2 shows the thermometer of FIG. 1 in a perspective view; and

FIG. 3 illustrates a detail of the apparatus of FIG. 2 in a different operative condition, and without a cover to reveal internal structure.

Figure 1:
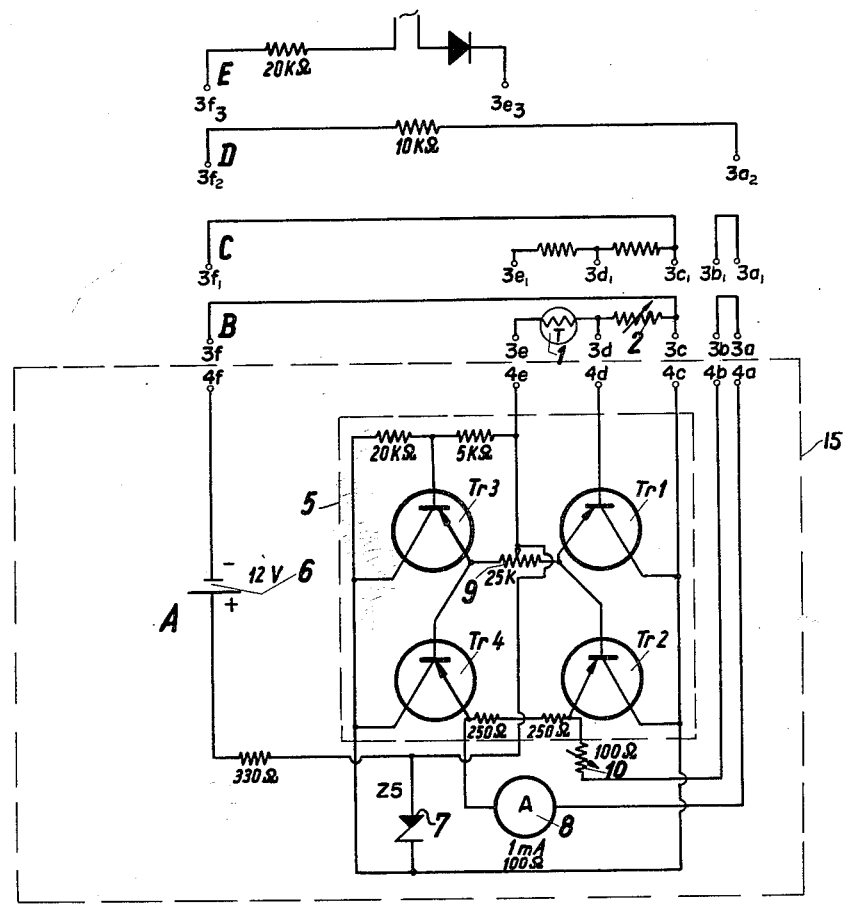
FIG. 1 is a schematic wiring diagram of a clinical thermometer of the invention and of its accessory parts.

Referring now to the drawing, and initially to FIG. 2, there are seen the indicator unit A and the temperature sensing unit B of a clinical thermometer according to my invention. The two units may be conductively connected by engagement of a multiple contact socket 3 on the sensing unit B with a corresponding plug 4 on the indicator unit A.

The sensing unit B includes a tubular rod 11 of polytetrafluoroethylene resin ("Teflon") supported by means of a short length 12 of flexible silicone rubber on a coupling element 3. A tightly fitting sleeve 13 of silicone rubber forms a removable cover for the coupling element. The free tip of the rod 11 carries a bead type thermistor 1.

The coupling plug 4 is connected by a multiple conductor cable 14 to an instrument housing 15. The scale of an ammeter 8 is visible through a transparent portion of the housing wall. The scale reads in degrees centigrade from 35° C. to 42° C., the normal range of body temperatures to be measured. No normally accessible operating handles or adjusting knobs are provided on the sensing unit B or the indicator unit A. The bottom of the housing 15, not visible in the drawing, is attached by means of screws in a conventional manner to give a technician access to the interior of the housing 15.

The sensing unit B may be adjusted after removal of the resilient cover sleeve 13 as illustrated in FIG. 3 in which the plug element 4 is shown engaged in the socket element 3. A wire-wound variable resistor 2 having a "Teflon" body is arranged in a cavity within the socket 3 and may be adjusted by means of a screw driver inserted into a slot on the movable resistor contact.

The nurse measures a patient's temperature by engaging the plug 4 in the socket 3, inserting the thermistor 1 and a portion of the rod 11 in a suitable body cavity of the patient, and reading his body temperature within a few seconds from the scale of the ammeter 8. She then withdraws the sensing unit B from the patient, disengages the sensing unit from the indicator unit A, connects another sensing unit B with the indicator unit and proceeds to measure the temperature of the second patient in the manner outlined above. As many sensing units B as there are patients to be tested at any one time are used in cooperation with a single indicator unit A. After completion of a round of measurements, the several sensing units are cleaned and subjected to dry sterilization at 350° F.±50° F. for repeated use. No other preparation of the apparatus for the next group of measurements is normally required.

The wiring diagram of the apparatus illustrated in FIGS. 2 and 3, and of certain accessories is shown in FIG. 1. In addition to the indicator unit A and one sensing unit B, there are shown a calibrating unit C, a battery testing unit D, and a battery charging unit E. The units C and D will each be understood to consist of a hollow socket element identical with that illustrated in FIGS. 2 and 3, and of circuit elements enclosed in the socket cavity. The battery charger unit E consists of such a socket element and of a line cord for connection of the socket element to an alternating current outlet. The circuits of the units A and B will be described first.

The plug 4 has six contacts 4a to 4f which engage corresponding contacts 3a to 3f of the socket 3 when the temperature sensing unit B is coupled to the indicator unit A. In addition to the ammeter 8, the housing 15 of the indicator unit A encloses a transistorized, direct current, push-pull amplifier 5 energized by a rechargeable 12-volt storage battery 6. A Zener diode 7 is shunted across the battery poles in the operative condition of the instrument to reduce the output of the battery 6 to a constant voltage. A potentiometer 9 is arranged for balancing the two substantially identical parallel sections of the amplifier, and a rheostat 10 arranged in series with the ammeter 8 varies its response, and thereby permits the measurement range of the ammeter to be expanded and contracted. The ammeter has a resistance of 100 ohms and a full-scale range of 0 to 1 milliampere.

The contacts 4a, 4b of the plug 4 are in the ammeter circuit. The corresponding contacts 3a, 3b of the socket 3 are connected so that the ammeter circuit is closed only when the plug 4 is inserted in the socket 3. The positive and negative poles of the battery 6 are respectively connected to the contacts 4e and 4f. The socket contacts 3c and 3f are directly connected so that the battery circuit from the negative pole of the battery to the common ground contact 4c on the indicator unit A is closed only when the sensing unit is coupled to the indicator unit. A 330 ohm resistor in the positive battery lead limits the battery current.

The apparatus when made operative by engagement of the coupling 3, 4 constitutes a Wheatstone resistance measuring bridge. The four bridge resistors are respectively constituted by the thermistor 1 by the variable resistor 2, and by two reference resistors of 5,000 and 20,000 ohms respectively. The thermistor 1 and the variable resistor 2 which constitute the resistors of the measurement section of the bridge arrangement are mounted in the sensing unit B and are arranged in series between the contacts 3c and 3e. In the operative condition of the instrument, they are thus interposed between the battery poles. The reference resistors of 5 and 20 kiloohms respectively are simularly interposed in series between the battery poles by being connected to the contacts 4c and 4e.

The connected terminals of the measurement resistors are connected to the base of a transistor $Tr_1$ in the measurement section of the amplifier 5 through the contacts 3d and 4d, and the connected terminals of the reference resistors are connected to the base of a transistor $Tr_3$ in the reference section of the amplifier. The resistors thus provide base bias to the transistor $Tr_1$ and $Tr_3$. Both transistors are of the type OC 604 and are substantially identical. Their emitters are connected to each other by the 25 kiloohm resistor element of the potentiometer 9, and are respectively connected to the bases of transistors $Tr_2$ and $Tr_4$ which are of the type OC 308. The movable contact of the potentiometer 9 is connected to the positive battery lead. The emitters of the transistors $Tr_2$ and $Tr_4$ are respectively connected to the terminals of the ammeter 8 and to the positive battery lead through respective 250 ohm resistors. The afore-mentioned range varying rheostat 10 and the instrument switch constituted by the contacts 4b, 3b, 3a, 4a are interposed in series between the emitter of the transistor $Tr_2$ in the measurement section of the amplifier 5 and the ammeter 8. The collectors of the four transistors are connected to the common ground contact 4c.

Two calibrating units of which only one unit C is shown in the drawing are employed for setting the potentiometer 9 and the rheostat 10 of the indicator unit from time to time. The wiring of the illustrated calibrating unit is identical with that of the sensing unit B except for replacement of the thermistor 1 and of the variable resistor 2 by two fixed calibrating resistors selected in such an manner that the bridge circuit is balanced when the movable contact of the potentiometer 9 is approximately centered on its resistor element. The potentiometer 9 is set for a zero reading (35° C.) on the ammeter while the illustrated calibrating unit C is coupled to the indicator unit A by its contacts $3a_1$ to $3e_1$.

For an initial calibrating of the instrument, each sensing unit B is coupled to the indicator unit A. Its thermistor B is brought to precisely 35° C. by insertion in a liquid or in air heated to that temperature. The resistor 2 is adjusted until the ammeter current is zero, and the ammeter reads 35° indicating a state of balance in the bridge circuit of any one sensing unit B. The thermistor 1 is next brought to 42° C in a corresponding manner, and the rheostat 10 is adjusted to deflect the ammeter needle over the full scale to a reading of 42° C.

Thermistors of the same type differ in their resistance at the same temperature due to unavoidable manufacturing tolerances, but their negative temperature coefficients are so closely similar over the narrow temperature range which is relevant to clinical temperature determination that the differences if any may be safely disregarded. When the indicator unit A of my invention has been calibrated for use with a specific sensing unit B, all other sensing units having the same type of thermistor may be employed with the same indicator unit after adjustment of their variable resistors 2 to a zero (35° C.) ammeter reading while the thermistor is at 35° C.

I prefer to provide a second calibrating unit similar to the unit C, but equipped with calibration resistors reflecting the resistance ratio between a thermistor and its adjusted variable resistor at the temperature of 42° C. This unit, not itself illustrated in the drawing, permits the rheostat 10 to be set without the need for bringing a sensing unit to precisely 42° C.

After the temperature measuring apparatus has been initially calibrated in the manufacturing shop, its accuracy is adequately maintained by occasionally coupling the calibration units to the indicator unit A and adjusting the settings of the potentiometer 9 and of the rheostat 10 for zero and full scale deflection of the ammeter needle respectively. Such adjustments compensate for any changes in the characteristics of the resistors and transistors in the amplifier.

The several sensing units B may be checked at fairly widely spaced intervals for any necessary resistor adjustment by inserting the thermistor 1 in a constant temperature bath at 35° C. as described above. Reliable silicon thermistors and environment resisting variable resistors which are commercially available do not show any significant changes in resistance values when subjected to hundreds of cycles each involving taking of a temperature reading and subsequent dry sterilization, nor are they otherwise affected significantly by sterilizing temperatures of about 350° F.

It is evident that several indicator units A and a large number of sensing units B may be readily matched to permit the indicator units to be interchangeably employed with each of the sensing units. The occasional adjustments can be made by any semi-skilled laboratory technician.

The condition of the battery 6 is routinely checked at intervals depending on the work load by the battery testing unit D which merely consists of a socket 3 whose contacts $3a_2$ and $3f_2$ are connected by a 10,000 ohm resistor. Coupling of the battery testing unit to the indicator unit A should give a full scale reading on the ammeter 8. A lower reading indicates the need for recharging the battery 6. Such recharging is achieved by connecting the indicator unit to an alternating current line by the charging unit E. The unit has a socket 3 in which a 20 kiloohm resistor and a rectifier diode are arranged between respective terminals of a line cord and the contacts $3e_3$ and $3f_3$ respectively. Testing and recharging of the battery 6 does not exceed the skill of a nurse's aid.

No adjustments are involved in the normal day-to-day use of the clinical thermometer of my invention. The apparatus is inexpensive to build because of the use of an indicating instrument of low sensitivity. The instrument may be of a conventional shock resisting rugged type not available at reasonable cost in the high sensitivity instruments heretofore used for research purposes. The sensing units withstand the thermal stresses involved in routine sterilization. They are alternatively connected to a common indicator unit by merely plugging one coupling element into another one. The battery and the indicating instrument of the indicator unit are normally switched off, and are automatically switched on by the engagement of the plug-and-socket coupling.

The four-transistor direct current amplifier 5 which permits the use of a low-sensitivity ammeter for indicating the sensed temperature is inherently compensated for temperature variations by the push-pull arrangement of its measuring and reference sections. The decreasing voltage of the battery 12 as it is being discharged is without influence on the performance of the instrument because the instrument voltage is stabilized by the Zener diode 7.

Obviously, many modifications and variations of the present invention are possible in the light of the above teachings. It is therefore to be understood that within the scope of the appended claims, the invention may be practiced otherwise than as specifically disclosed.

What I claim is:

1. A temperature measuring instrument comprising, in combination,
    (a) a first coupling element;
    (b) temperature sensitive resistor means;
    (c) variable resistor means, said temperature sensitive resistor means and said variable resistor means constituting two measurement resistor means;
    (d) first conductor means connecting said temperature sensitive resistor means and said variable resistor means to said first coupling element;
    (e) a second coupling element engageable with said first coupling element;
    (f) two reference resistor means;
    (g) a source of electric current;
    (h) electrical measuring instrument means having two terminals;
    (i) second conductor means connecting said two reference resistor means, said source, and said instrument means to said second coupling element, said two measurement resistor means and said two reference resistor means being connected by said first and second conductor means to constitute the four resistors of a Wheatstone bridge circuit when said coupling elements are engaged, said source and said instrument means being connected to said four resistors by said conductor means for respectively energizing said bridge circuit and for indicating the state of balance thereof; and
    (j) amplifier means including a measurement amplifier section interposed between said measurement resistor means and one of said terminals, and a reference amplifier section interposed between said reference resistor means and the other one of said terminals.

2. An instrument as set forth in claim 1, wherein said instrument means is an ammeter.

3. An instrument as set forth in claim 1, wherein said amplifier sections jointly constitute push-pull amplifier means.

4. An instrument as set forth in claim 3, wherein said amplifier sections each include transistor means having a base, a collector, and an emitter; and said measurement resistor means and said reference resistor means constitute respective voltage divider means interposed between one pole of said source and the collector and base of a respective transistor means for supplying base bias voltage to said base.

5. An instrument as set forth in claim 3, further comprising potentiometer means connected to said source and to said amplifier sections for balancing said sections.

6. An instrument as set forth in claim 5, further comprising a third coupling element engageable with said second coupling element; two calibrating resistor means; and third conductor means connecting said calibrating resistor means to said third coupling element, said calibrating resistor means and said two reference resistor means being connected by said second and third conductor means to constitute the four resistors of another Wheatstone bridge circuit when said second and third coupling elements are engaged, said source and said instrument means being connected to said last-mentioned four resistors by said second and third conductor means for respectively energizing said other Wheatstone bridge circuit and for indicating the state of balance thereof, said measurement amplifier section being interposed between said calibrating resistor means and said one terminal of said instrument means.

7. An instrument as set forth in claim 1, wherein said instrument means is an ammeter, and further comprising rheostat means in series circuit with said ammeter for varying the response thereof.

8. An instrument as set forth in claim 1, wherein said source is a rechargeable battery, the instrument further comprising rectifier means; a fourth coupling element; and fourth conductor means for connecting said fourth coupling element and said rectifier means to a source of alternating current, said fourth coupling element being engageable with said second coupling element for feeding rectified alternating current to said battery through said second conductor means.

9. An instrument as set forth in claim 1, wherein said first coupling element constitutes a support, said temperature sensitive resistor means and said variable resistor means are mounted on said support, said support and the resistor means mounted thereon being of materials substantially unaffected by temperatures of approximately 350 degrees Fahrenheit.

References Cited in the file of this patent

UNITED STATES PATENTS

| 2,673,960 | Doblmaier | Mar. 30, 1954 |
| 2,685,203 | McEvoy et al. | Aug. 3, 1954 |
| 2,813,934 | Cibelius et al. | Nov. 19, 1957 |
| 2,938,385 | Mack et al. | May 31, 1960 |
| 3,036,464 | Beeston | May 29, 1962 |
| 3,054,067 | Merrill et al. | Sept. 11, 1962 |

FOREIGN PATENTS

| 759,381 | Great Britain | Nov. 11, 1954 |